United States Patent
Simonetti et al.

(10) Patent No.: US 7,321,123 B2
(45) Date of Patent: Jan. 22, 2008

(54) METHOD AND APPARATUS FOR RADIATION DETECTION IN A HIGH TEMPERATURE ENVIRONMENT

(75) Inventors: John Simonetti, Hamilton, NJ (US); Joel L. Groves, Leonia, NJ (US); Wolfgang Ziegler, Hightstown, NJ (US); Art Liberman, Palo Alto, CA (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/312,841

(22) Filed: Dec. 20, 2005

(65) Prior Publication Data

US 2007/0138399 A1    Jun. 21, 2007

(51) Int. Cl.
*G01T 1/20* (2006.01)
*G01T 1/24* (2006.01)

(52) U.S. Cl. ............... 250/370.11; 250/256; 250/253; 250/581; 250/301

(58) Field of Classification Search ............. None
See application file for complete search history.

(56) References Cited

U.S. PATENT DOCUMENTS

| | | | |
|---|---|---|---|
| 2,902,603 A * | 9/1959 | Ferre ........................ | 250/368 |
| 3,531,651 A | 9/1970 | Lieber | |
| 3,676,674 A * | 7/1972 | Zaviantseff ............ | 250/363.01 |
| 3,919,577 A | 11/1975 | Berninger | |
| 4,396,853 A * | 8/1983 | Caraher ........................ | 313/527 |
| 4,454,422 A | 6/1984 | Persyk | |
| 4,883,956 A * | 11/1989 | Melcher et al. ........... | 250/269.2 |
| 5,483,062 A * | 1/1996 | Czirr et al. .................. | 250/256 |
| 5,656,807 A * | 8/1997 | Packard ................ | 250/214 VT |
| 5,961,714 A * | 10/1999 | Melcher et al. ............... | 117/13 |
| 6,437,336 B1 | 8/2002 | Pauwels | |
| 6,818,896 B2 * | 11/2004 | Pauwels et al. ......... | 250/361 R |
| 2004/0200964 A1 | 10/2004 | Lefaucheur | |

FOREIGN PATENT DOCUMENTS

EP    0456002 A2    11/1991

OTHER PUBLICATIONS

Definition of Weld—Roget's New Millenium Thesaurus, First Edition (v 1.3.1), Lexico Publishing Group, LLC. Feb. 14, 2007. <Thesaurus.com http://thesaurus.reference.com/browse/weld>.*

(Continued)

*Primary Examiner*—David Porta
*Assistant Examiner*—Yara B Green
(74) *Attorney, Agent, or Firm*—Karan Singh; Jaime Castano; Dale Gaudier

(57) ABSTRACT

A radiation detector operating at high temperatures is shown comprising a LuAP scintillating material for producing light when excited by incident radiation, a photocathode, and an electron multiplier. The photocathode is deposited directly onto the surface of the scintillating material that is oriented toward the electron multiplier. In a preferred embodiment, a metal flange is hermetically sealed to the scintillating material and this is fusion welded to the electron multiplier to create a vacuum envelope. This invention is particularly useful in high temperature noisy environments such as downhole operations to detect radiation within a well hole.

1 Claim, 4 Drawing Sheets

OTHER PUBLICATIONS

Kovar Technical Data—http://www.hightempmetals.com/techdata/hitempKovardata.php.*

Definition of flange—American Heritage Dictionary of the English Language. Retreived 2007, http://www.xrefplus.com/entry/4087945.*

Photomultiplier—McGraw-Hill Encyclopedia of Science and Technology. Copyright 2005 by the McGraw-Hill Companies, Inc.*

Handbook of Small Electric Motors. Yeadon and Yeadon, eds. 2001, McGraw-Hill, p. 2.84.*

I. Holl, E. Lorenz, G. Mageras, "A Measurement of the Light Yield of Common Inorganic Scintillators", IEEE Transactions on Nuclear Science, vol. 35, No. 1, Feb. 1988, pp. 105-109.

C. L. Melcher, R. A. Manente, and J. S. Schweitzer, "Applicability of Barium Fluoride and Cadmium Tungstate Scintillators for Well Logging", IEEE Transactions on Nuclear Science, vol. 36, No. 1, Feb. 1989, pp. 1188-1192.

Yao Xiaoguang, "A Study of Light Collection Efficiency in Scintillation Detectors", Nuclear Instruments and Methods in Physics Research 228, 1984, pp. 101-104, Elsevier Science Publishers B.V.

Stephen E. Derenzo, and John K. Riles, "Monte Carlo Calculations of the Optical Coupling Between Bismuth Germanate Crystals and Photomultiplier Tubes", IEEE Transactions on Nuclear Science, vol. NS-29, No. 1, Feb. 1982, pp. 191-195.

Kazumasa Takagi and Tokuumi Fukazawa, "Cerium-Activated GD2SIO5 Single Crystal Scintillator", Appl. Phys. Lett. 42(1), Jan. 1, 1983, pp. 43-45, 1983 American Institute of Physics.

M. Laval, M. Moszynski, R. Allemand, E. Cormoreche, P. Guinet, R. Odru, and J. Vacher, "Barium Fluoride—Inorganic Scintillator for Subnanosecond Timing", Nuclear Instruments and Methods 206, 1983, pp. 169-176, North-Holland Publishing Company.

W. W. Moses and S. E. Derenzo, "Cerium Fluoride, A New Fast, Heavy Scintillator", IEEE Transactions on Nuclear Science, vol. 36, No. 1, Feb. 1989, pp. 173-176.

D. F. Anderson, "Properties of the High-Density Scintillator Cerium Fluoride", IEEE Transactions on Nuclear Science, vol. 36, No. 1, Feb. 1989, pp. 137-140.

Shinzou Kubota, Shirou Sakuragi, Satoshi Hashimoto and Jian-Zhi Ruan, "A New Scintillation Material: Pure CSI with 10 NS Decay Time", Nuclear Instruments and Methods in Physics Research A268, 1988, pp. 275-277, Elsevier Science Publishers B.V.

M. Moszynski, D. Wolski, T. Ludziejewski, M. Kapusta, A. Lempicki, C. Brecher, D. Wisniewski, A. J. Wojtowicz, "Properties of the New Luap: CE Scintillator", Nuclear Instruments and Methods in Physics Research A385, 1997, pp. 123-131, Elsevier Science B.V.

C. D'Ambrosio, F. De Notaristefani, H. Leutz, D. Puertolas, and E. Rosso, "X-Ray Detection with a Scintillating Yap-Window Hybrid Photomultiplier Tube", IEEE Transactions on Nuclear Science, vol. 47, No. 1, Feb. 2000, pp. 6-12.

A. H. Sommer, "Photoemissive Materials—Preparation, Properties, and Uses", Robert E. Krieger Publishing Company, Huntington, New York, 1980.

* cited by examiner

METHOD AND APPARATUS FOR RADIATION DETECTION IN A HIGH TEMPERATURE ENVIRONMENT

BACKGROUND OF THE INVENTION

This invention relates to a method and apparatus for radiation detection. More specifically, this invention relates to a method and apparatus for radiation detection in a high temperature environment.

The detection of radiation through the use of scintillating material has been successfully employed in the past in a variety of contexts. In this, light is produced by a scintillating material in response to incident radiation. This light is operably converted to an electrical signal through the use of a photomultiplier ("PMT") and this electrical signal can be used to determine the amount and strength of the incident radiation.

In conventional radiation detectors utilizing scintillating material, the scintillating material and PMT are usually two separate components. Each is fabricated independently and they are brought together at a final stage of construction. The common practice in creating this type of detector is to first cut and polish the scintillating material to the required shape and then encapsulate it within a light-tight, mechanically protective container with optically reflective material on all sides except for one of the end faces to allow the scintillator light to be transmitted to the PMT cathode. An optical window is then attached to this open end through the use of a coupling agent such as silicone. The clear face of the scintillating material is then coupled with a PMT using another coupling agent.

One problem with conventional scintillation-type radiation detectors is the fact that at each of the couplings, photons created in the scintillation process are abated because of a mismatch in the indices of refraction or because of absorption.

Prior attempts to remedy the problem of photon loss have primarily been directed to decreasing the size of the gaps between the scintillator, the window, and the PMT. Work has also been envisioned in the selection of the type of window into the PMT in hopes of transmitting the maximum amount of light from the scintillating material. Other prior constructions have deposited the photocathode directly on the scintillating material.

All of these approaches suffered from one or more limitations. While the decrease in the size of the interface gaps is helpful, it is not possible to eliminate gaps entirely. As such, photons continue to be lost in traversing gaps and coupling agents. Window design entails compromises and direct deposit applications have not been useful in high temperature environments.

Scintillation type radiation detectors find useful application in a variety of environments. One application of particular interest in the petroleum industry is the use of scintillation technology to make density and other measurements within a well hole. Downhole applications, however, present a challenge because of the temperature at which the radiation detector must operate and the fact that increased vibration may affect the integrity of the interfaces between components The difficulties and limitations suggested in the preceding are not intended to be exhaustive, but rather are among many which demonstrate that although significant attention has been devoted to increasing efficiency and sensitivity in scintillating type radiation detectors, the prior attempts do not satisfy both the desired increase in efficiency and the need for operation in noisy, high temperature environments.

BRIEF SUMMARY OF A PREFERRED EMBODIMENT OF THE INVENTION

A preferred embodiment of the invention comprises a method and apparatus for measuring radiation in a high temperature environment. In a preferred embodiment, a photocathode is deposited directly onto a concave surface of a scintillating material. This surface is oriented toward an electron multiplier comprising focus electrodes and a dynode stack. Radiation incident on the scintillating material causes it to generate light, when this light comes into contact with the photocathode, electrons are output that are then amplified by the electron multiplier and output on a wire for measurement.

THE DRAWINGS

Objects and advantages of the present invention will become apparent from the following detailed description of embodiments taken in conjunction with the accompanying drawings, wherein.

DETAILED DESCRIPTION

Context of the Invention

Figures 1A, 1B:
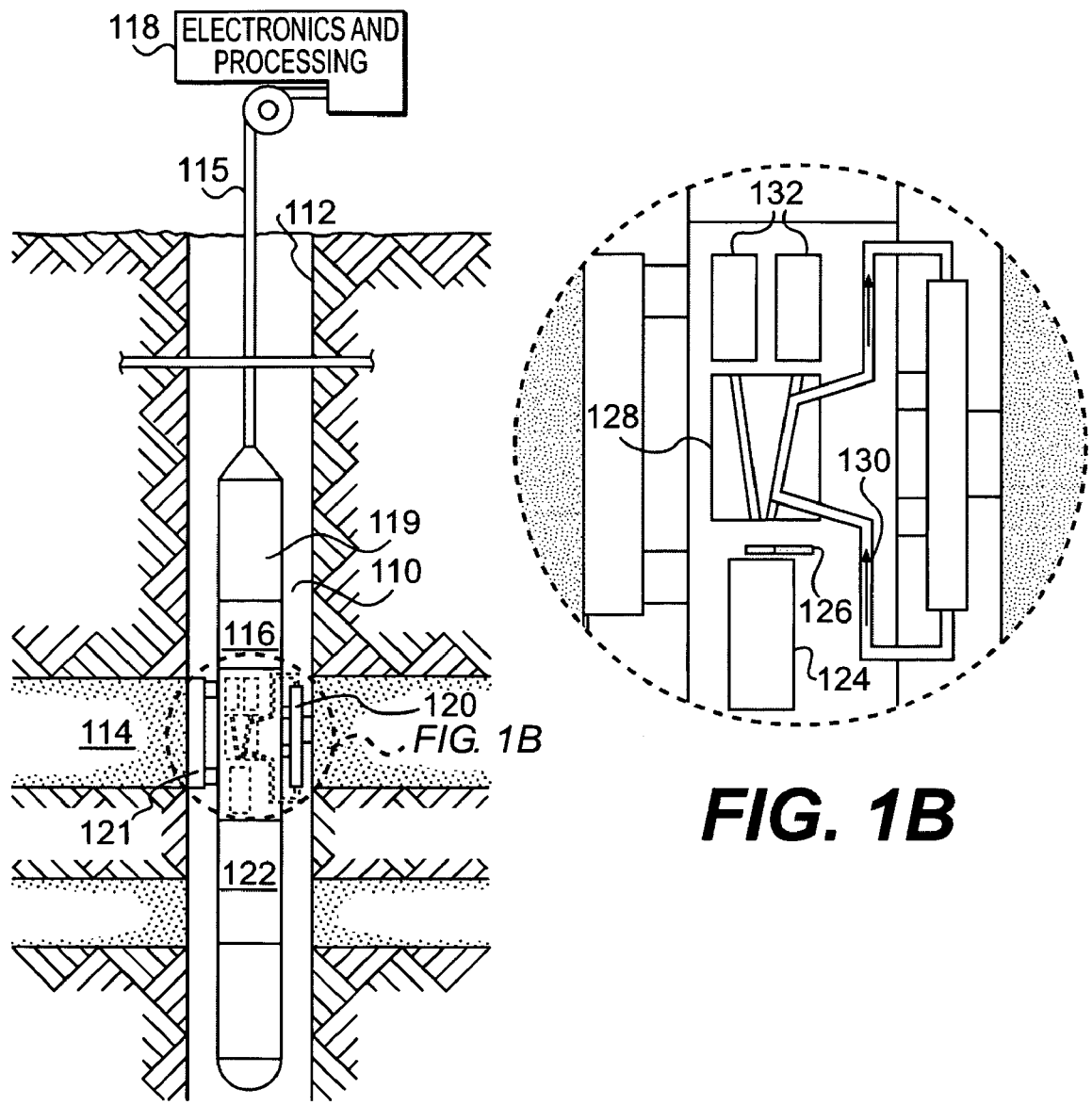
FIG. 1A is a schematic view of the context in which the present invention can be used to advantage.
FIG. 1B is an expanded schematic view of a scintillator system for measuring density of fluid material within a borehole.

Referring now to the drawings and particularly to FIGS. 1A and 1B, there is shown a schematic illustration of a preferred operational context of the instant invention. In this, borehole tool 110 is shown for analyzing materials from a formation 114. The tool 110 is suspended in the borehole 112 from the lower end of a cable 115. The cable 115 is anchored onto and lowered from the surface of the borehole. On the surface, cable 115 is electrically coupled to an electronic control system 118 for information storage and processing. The tool 110 includes an elongated body 119 which encloses the downhole portion of the tool control system 116. The elongated body 119 may also carry a fluid admitting channel 120 and an extendable tool anchoring member 121 which are arranged on opposite sides of the elongated body 119. Admitted fluid flows through an analysis line 130, note FIG. 1B, and analysis cell 128. Radiation is passed through a filter 124, the admitted fluid, and a reference channel of an analysis cell 128. Radiation detectors 132 measure the radiation after it has traversed the analysis cell. The instant invention is a radiation detector that may be used to advantage in this and other contexts where significant noise and high temperature issues are encountered.

High Temperature Radiation Detector

Figure 2:
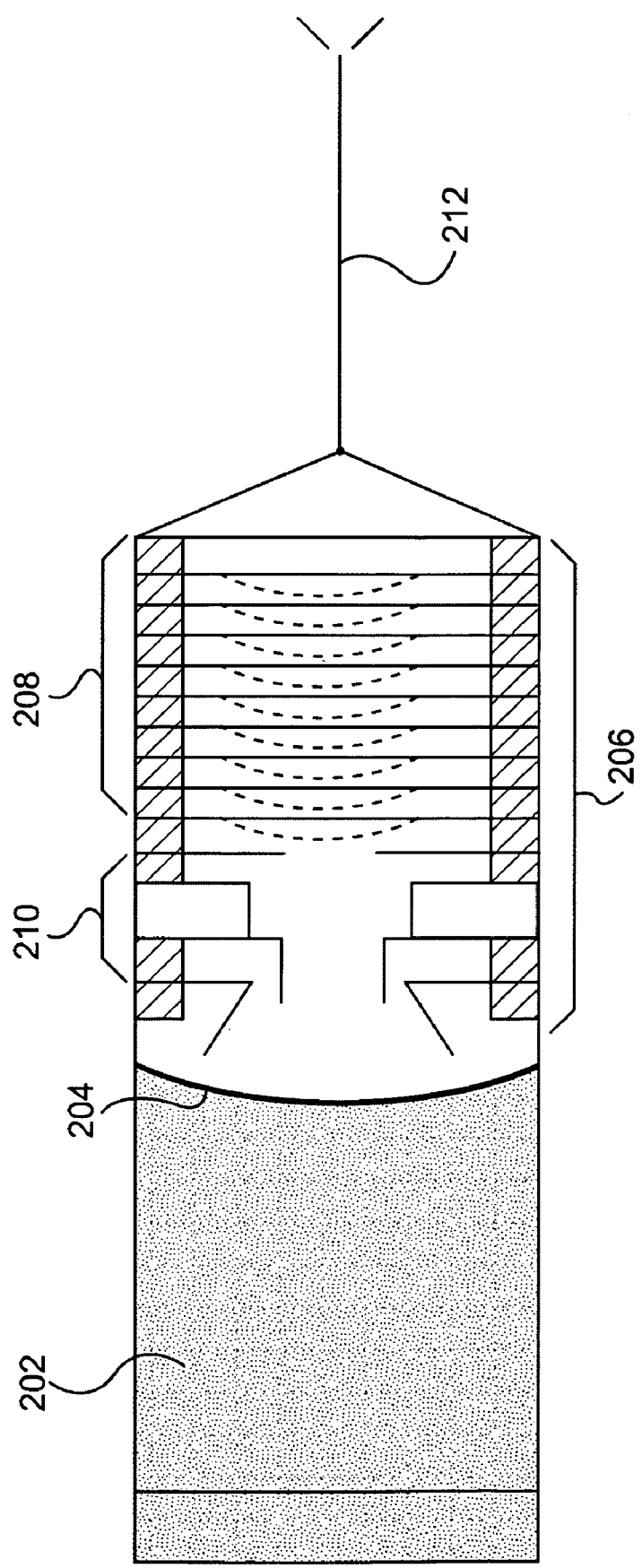
FIG. 2 is a cross-sectional schematic view of one preferred embodiment of the present invention where the scintillating material is an integral part of a vacuum envelope.

The structure of a first embodiment of the instant invention is shown in FIG. 2. The three major components of the radiation detector comprise a scintillating material 202, a photocathode 204, and an electron multiplier 206. Scintillating material 202 produces light in the form of photons in response to incident radiation. These photons are bounced off the wall of the detector and make their way to an open surface of the scintillating material 202. A photocathode 204 is deposited directly onto the surface of the scintillating material 202 with no gap of air or coupling agent disposed between. This effectively eliminates the loss of photons during traversal of the interface between the scintillating material 202 and the photocathode 204 which is a weakness inherent in prior art systems.

When a photon comes into contact with photocathode 204, three major events occur: 1) the incident photon is absorbed and its energy is transferred to an electron within the photocathode material, 2) the electron migrates to the surface of the atom, and 3) the electron escapes from the surface of the photocathode material. The greater the number of incident photons, the larger the number of electrons that will be emitted from the photocathode. Scintillating materials are carefully chosen to not react and change the operation of the highly reactive photocathode. There may be a separate layer of non-reactive material deposited between scintillating material 202 and photocathode 204. This would not change the overall operation of the detector and may be used to isolate the chemically reactive photocathode from the surface of the scintillating material.

After the electrons are produced by the photocathode 204, it is necessary to use the electron multiplier 206 to amplify the signal to a measurable level. Electron multipliers are well known in the art and are a common part of PMTs. The one shown here comprises a set of focus electrodes 210 for directing the electrons to a dynode stack 208. Each dynode in the stack 208 multiplies the number of incident electrons with an additive effect leading to a greatly increased signal. This amplified signal is conveyed along wire 212 to a mechanism for detecting the amount of output current. This measurement is used to determine the amount and intensity of radiation encountered by the detector.

It is further necessary that scintillating material 202, photocathode 204, and electron multiplier 206 are enclosed in a vacuum. It is also preferred to make the surface of the scintillating material that faces the electron multiplier 206 concave with respect to the electron multiplier. This aids in directing the maximum number of electrons to the multiplier 206.

Proper construction of this type of radiation detector is necessary to produce an operational system. During construction and operation, the radiation detector will be subjected to high temperatures and must operate at 100° C. and higher. Accordingly, the materials used as the scintillating material 202 and the photocathode 204 must be selected to exhibit compatible thermomechanical properties. It is necessary for the scintillating material 202 and photocathode 204 to expand at a similar rate so that the photocathode layer remains intact. Very few scintillating materials are available that fit all constraints. In the preferred embodiment, LuAP ($LuAlO_3:Ce^{3+}$) is used. Lutetium based compounds are advantageous because they are slightly radioactive in that they produce light with no input of radiation. The decay of this radioactivity over time is known, so these compounds may be used to calibrate the radiation detector. Other compounds that can be used are BGO ($Bi_4Ge_3O_{12}$), LSO ($Lu_2SiO_5:Ce^{3+}$), LYSO ($Lu_{(2x)}Y_{(x)}SiO_5:Ce$) GSO ($Gd_2SiO5$); YAP ($YAlO_3:Ce^{3+}$), LPS ($Lu_2Si_2O_7$). Another class of scintillating materials that may be used are difluorides and trifluorides. These types of compounds have a very fast scintillation decay of 800 ps at a wavelength of 210 nm. This short wavelength emission is impossible to see in the prior art separated scintillator/photocathode configurations. The information is lost in the interface of the elements.

Figure 3:
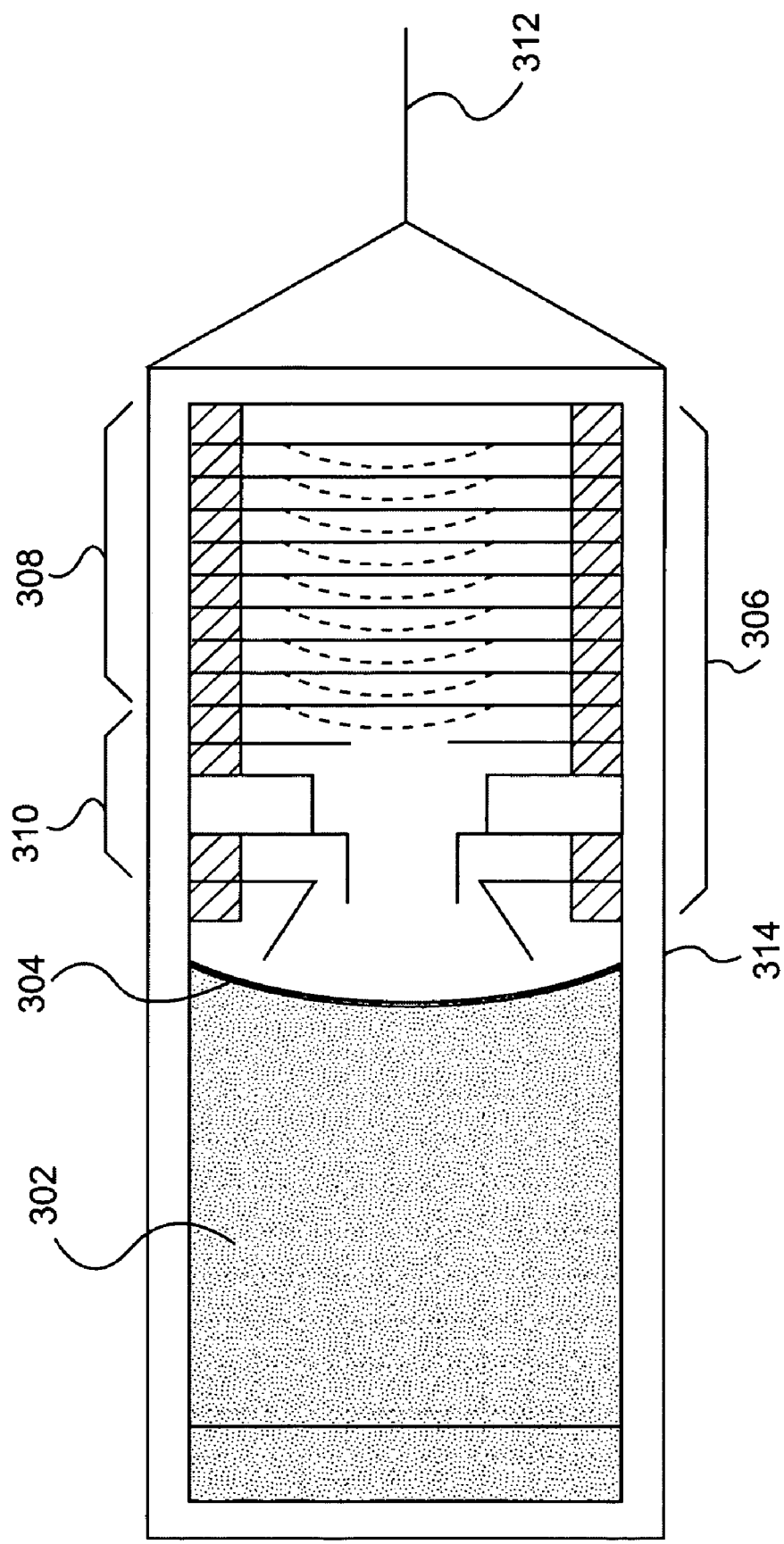
FIG. 3 is a cross-sectional schematic view of another preferred embodiment of the present invention having a separate vacuum envelope.

All of the elements of the radiation detector 132 must be contained within a vacuum and in FIG. 3, one embodiment is shown. The figure shows scintillating material 302, photocathode 304, and electron multiplier 306 that is made up of focus electrodes 310 and a dynode stack 308. An amplified signal is conveyed along wire 312 to a mechanism for detecting the amount of output current. This assembly is fully encapsulated within a vacuum envelope 314. The advantage of this embodiment is the fact that the materials are subjected to less heat in the manufacturing process and are more shielded from the environment of the borehole.

Figure 4:
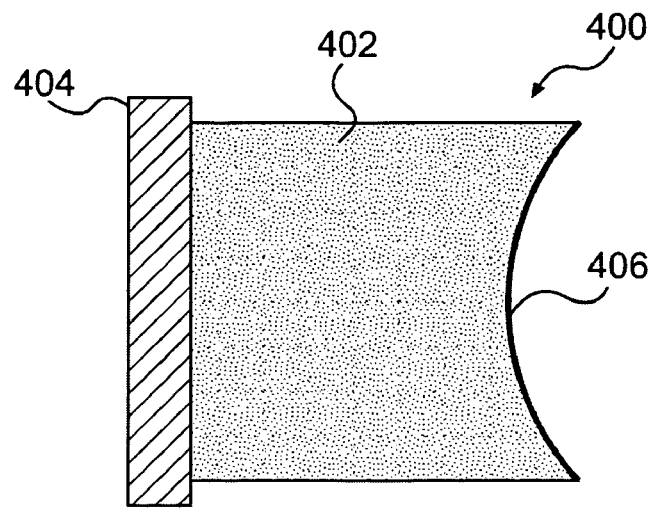
FIG. 4 is a detail view of a flange/scintillator assembly operable for use in a preferred embodiment.

Another preferred embodiment includes the scintillating material as an integral part of the vacuum envelope. FIG. 4 shows an assembly 400 that is required for this embodiment. The scintillating material 402 is present along with a photocathode 406. A metal flange 404 must be hermetically sealed to the scintillating material. This scintillator/flange assembly is then fusion welded to the electron multiplier 206 resulting in the embodiment shown in FIG. 2. The advantage of this embodiment is the fact that it does not require extra stabilizing mechanics that must be used in the embodiment of FIG. 3.

The preferred scintillating materials used in this embodiment are LuAP, LSO, LYSO, YAP, and LPS. The preferred metal for the flange construction is KOVAR, a nickel, iron, and copper alloy. The makeup of KOVAR is 29% Ni, 17% Co, 53% Fe, and 1% trace elements. This metal is chosen for its thermomechanical properties that cause it to expand at a rate substantially the same as the scintillating materials and thus the detector can operate at high temperatures. Although KOVAR is preferred, other metals that exhibit thermomechanical properties similar to the scintillating material can be used.

Figure 5:
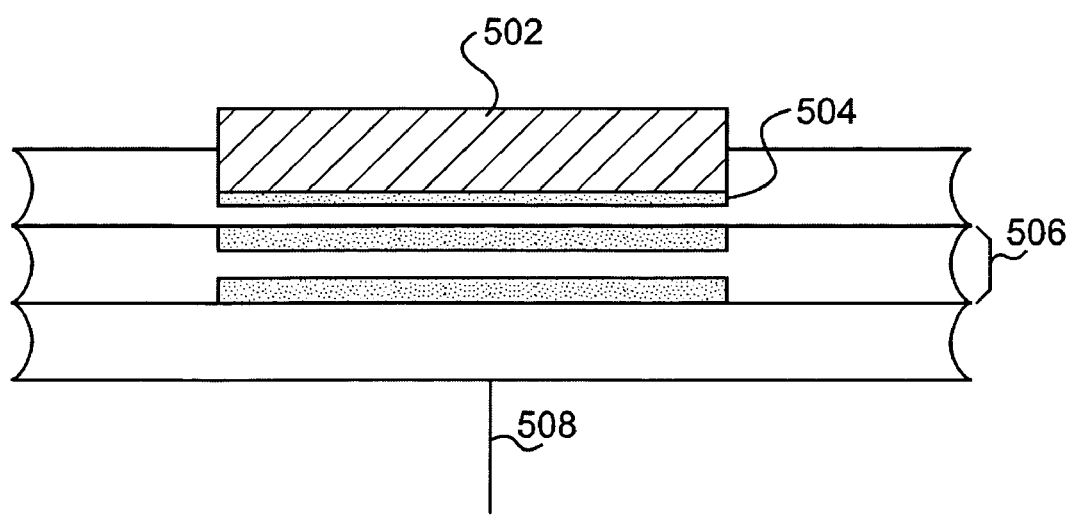
FIG. 5 is a cross-sectional view of a microchannel plate embodiment of the present invention.

Another embodiment, shown in FIG. 5 utilizes a number of channel multipliers in the form of a microchannel plate (MCP). A channel multiplier is a channel with surfaces that emit secondary electrons when impacted by an electron. An MCP is a cluster of thousands of channels, each one acting as an individual multiplier. Different channel configurations are implemented to decrease the amount of feedback that may affect the output of the channel.

In FIG. 5, the MCP configuration of the present invention is shown. Scintillating material 502 generates light when excited by incident radiation. Photocathode 504 is directly deposited onto scintillating material 502 and the output electrons move to MCP 506. The output electrons are then conveyed along wire 508 and the generated current is measured.

All of these embodiments provide the stability and appropriate performance for radiation detection in noisy, high temperature environments such as in a downhole environment. The subject invention is not intended to be limited, however, to oil patch uses but rather finds significant advantage in any operative environment where noise and high temperatures are likely to be encountered during radiation detection operations.

Method of Operation

The present invention further comprises a method for radiation detection in a high temperature environment. The method includes providing a generally cylindrical scintillating member with a concave surface on one end thereof. A photocathode material that is selected to be thermomechanically compatible and chemically neutral with respect to the scintillating member is directly deposited onto the concave surface of the scintillating member.

In order to measure radiation the scintillating member and PMT are positioned within an environment for radiation detection having a temperature greater than or equal to 100° C. Alternatively, the scintillating material and PMT may be lowered through zones of materials during well logging operations. The scintillating member detects radiation from the high temperature environment by liberating electrons from the photocathode material by bombarding the photocathode with photons from the scintillating member. The number of electrons is then amplified through the use of an electron multiplier.

The method further comprises the step of maintaining a vacuum envelope around the scintillating member and photocathode. This vacuum envelope can be formed by fusion welding a flange/scintillating member assembly to the electron multiplier. The detection is further facilitated by matching the thermomechanical characteristics of said photocathode material with said scintillating material to avoid destabilization of said photocathode material when said detector is placed within a high temperature environment. In certain instances, a thin layer of non-reactive material is interposed between the scintillating member and photocathode material to preserve the integrity of the photocathode.

SUMMARY OF MAJOR ADVANTAGES OF THE INVENTION

After reading and understanding the foregoing detailed description of the subject radiation detector for operation at high temperatures in accordance with the preferred embodiments of the invention, it will be appreciated that several distinct advantages are obtained.

Without attempting to set forth all the desirable features of the instant radiation detector, at least some of the major advantages include providing a radiation detector for operation at high temperatures where a photocathode material is deposited directly onto the surface of a scintillating material for operation at high temperatures greater than or equal to 100° C. In one embodiment, the scintillating material is an integral part of the vacuum envelope.

This structure minimizes photon loss thus increasing the sensitivity of the detector. The ability to operate at high temperatures is facilitated by the selection of materials with similar thermomechanical properties allowing the detector to provide information in high noise and temperature environment such as those experienced downhole in a well drilling operation. Additionally, the proper selection of the scintillating material and the photocathode prevents reaction between the highly reactive photocathode and the scintillating material.

In describing the invention, reference has been made to preferred embodiments and illustrative advantages of the invention. The subject invention, however, is not limited to wellhole technology and is rather intended to provide useful application in all contexts where radiation detection is desired. Those skilled in the art and familiar with the instant disclosure of the subject invention may recognize additions, deletions, modifications, substitutions, and other changes which fall within the purview of the subject invention and claims.

What is claimed:

1. A radiation detector for operation at high temperatures with mechanical integrity for use in making measurements downhole within a well hole comprising:
    a generally cylindrical single crystal LuAP scintillating material for emitting light photons when excited by incident radiation from downhole within a well hole;
    a photocathode deposited directly on one end of said generally cylindrical single crystal LuAP scintillating material for emitting electrons and other portions of said generally cylindrical single crystal LuAP scintillating material being exposed directly to a downhole operational environment within a well hole;
    an electron multiplier operably connected to said one end of said single crystal LuAP scintillating material and said photocathode downstream of said photocathode;
    said one end of said single crystal LuAP scintillating material and said photocathode being oriented toward said electron multiplier;
    a metal flange assembly hermetically sealed to said generally cylindrical single crystal LuAP scintillating material and said metal flange assembly being joined to said electron multiplier to form a vacuum enclosure about said electron multiplier downstream of said generally cylindrical single crystal LuAP scintillating material and said photocathode wherein the LuAP crystal forms a physical part of the vacuum enclosure of the electron multiplier; and
    said high temperatures being greater than or equal to 125° C.

* * * * *